US010769081B2

United States Patent
Sternberg et al.

(10) Patent No.: US 10,769,081 B2
(45) Date of Patent: *Sep. 8, 2020

(54) COMPUTER PROGRAM PRODUCT, SYSTEM, AND METHOD TO ALLOW A HOST AND A STORAGE DEVICE TO COMMUNICATE BETWEEN DIFFERENT FABRICS

(71) Applicant: INTEL CORPORATION, Santa Clara, CA (US)

(72) Inventors: Jay E. Sternberg, North Plains, OR (US); Phil C. Cayton, Warren, OR (US); James P. Freyensee, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 406 days.

This patent is subject to a terminal disclaimer.

(21) Appl. No.: 15/396,215

(22) Filed: Dec. 30, 2016

(65) Prior Publication Data

US 2018/0189204 A1 Jul. 5, 2018

(51) Int. Cl.
  *G06F 13/42* (2006.01)
  *G06F 13/16* (2006.01)
  *G06F 13/40* (2006.01)

(52) U.S. Cl.
  CPC ...... *G06F 13/1673* (2013.01); *G06F 13/4068* (2013.01); *G06F 13/42* (2013.01)

(58) Field of Classification Search
  None
  See application file for complete search history.

(56) References Cited

U.S. PATENT DOCUMENTS 10,200,376 B2  2/2019  Cayton et al.
10,176,116 B2  7/2019  Sternberg et al.
(Continued)

OTHER PUBLICATIONS

Barak, D., "ibv_post_send( )", RDMAmojo, [online], Feb. 18, 2015, [Retrieved Nov. 30, 2016], Retrieved from the Internet at <URL: http://www.rdmamojo.com/2013/01/26/ibv_post_send/>, 93 pp.

(Continued)

*Primary Examiner* — Henry Tsai
*Assistant Examiner* — Dean Phan
(74) *Attorney, Agent, or Firm* — Konrad Raynes Davda & Victor LLP; David W. Victor

(57) ABSTRACT

Provided are a computer program product, method, and system to transfer storage input/output (I/O) requests to host and target systems on different fabrics. An origination packet is received from an originating node over a first network to a destination node having a storage device. The origination packet includes a first fabric layer for transport through a first network, a command in a transport protocol with a storage Input/Output (I/O) request, with respect to the storage device at the destination node, and a host memory address. A destination packet is constructed including a second fabric layer for transport through a second network and the command in the transport protocol to send the storage I/O request and a transfer memory address that maps to the host memory address. The destination packet is sent over the second network to the destination node to perform the storage I/O request.

25 Claims, 8 Drawing Sheets

(56) References Cited

U.S. PATENT DOCUMENTS

| | | | |
|---|---|---|---|
| 2002/0156984 A1* | 10/2002 | Padovano | G06F 11/201 |
| | | | 711/148 |
| 2005/0198322 A1* | 9/2005 | Takabayashi | H04L 63/0281 |
| | | | 709/228 |
| 2009/0292861 A1 | 11/2009 | Kanevsky et al. | |
| 2013/0198311 A1 | 8/2013 | Tamir et al. | |
| 2015/0006663 A1* | 1/2015 | Huang | G06F 13/4221 |
| | | | 709/213 |
| 2015/0261720 A1* | 9/2015 | Kagan | G06F 13/4221 |
| | | | 710/308 |
| 2016/0085718 A1 | 3/2016 | Huang | |
| 2016/0127492 A1* | 5/2016 | Malwankar | H04L 67/2842 |
| | | | 709/212 |
| 2017/0177541 A1* | 6/2017 | Berman | G06F 15/17331 |
| 2017/0344259 A1 | 11/2017 | Freyensee et al. | |
| 2018/0189204 A1 | 7/2018 | Sternberg et al. | |

OTHER PUBLICATIONS

Minturn, D., "NVM Express Over Fabrics", 1th Annual OpenFabrics Software Developers' Workshop, Mar. 2015, 13 pp.

NVM Express Inc., "NVM Express Over Fabrics", Revision 1.0, Jun. 5, 2016, 49 pp.

Recio, R., et al., "A Remote Direct Memory Access Protocol Specification", RFC 5040, Oct. 2007, 67 pp.

Sardella, S., et al., "NVMe Over Fabrics Agenda", Aug. 11, 2015, 14 pp.

Final Office Action 1 for U.S. Appl. No. 15/630,884, dated Dec. 18, 2018, 11 pp.

International Search Report and Written Opinion for International Application No. PCT/US2017/064344, dated Nov. 12, 2018, 11 pp.

Response to Office Action 1 for U.S. Appl. No. 15/630,884, dated Nov. 5, 2018, 15 pp.

Office Action 1 for U.S. Appl. No. 15/630,884, dated Aug. 3, 2018, 11 pp.

Response to Final Office Action 1 for U.S. Appl. No. 15/630,884, dated Feb. 20, 2019, 14 pp.

Notice of Allowance 1 for U.S. Appl. No. 15/630,884, dated Mar. 8, 2019, 8 pp.

PCT International Preliminary Report on Patentability dated Jul. 11, 2019, pp. 7, for Application No. PCT/US2017/064344 filed Dec. 1, 2017.

Notice of Allowance 2 for U.S. Appl. No. 15/630,884, dated Apr. 30, 2019, 12 pp.

* cited by examiner

COMPUTER PROGRAM PRODUCT, SYSTEM, AND METHOD TO ALLOW A HOST AND A STORAGE DEVICE TO COMMUNICATE BETWEEN DIFFERENT FABRICS

TECHNICAL FIELD

Embodiments described herein generally relate to a computer program product, method, and system to allow a host and a storage device to communicate between different fabrics.

BACKGROUND

Non-Volatile Memory Express (NVMe) is a logical device interface (http://www.nvmexpress.org) for accessing non-volatile storage media attached via a Peripheral Component Interconnect Express (PCIe) bus (http://www.pcsig.com). The non-volatile storage media may comprise a flash memory and solid solid-state drives (SSDs). NVMe is designed for accessing low latency storage devices in computer systems, including personal and enterprise computer systems, and is also deployed in data centers requiring scaling of thousands of low latency storage devices.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
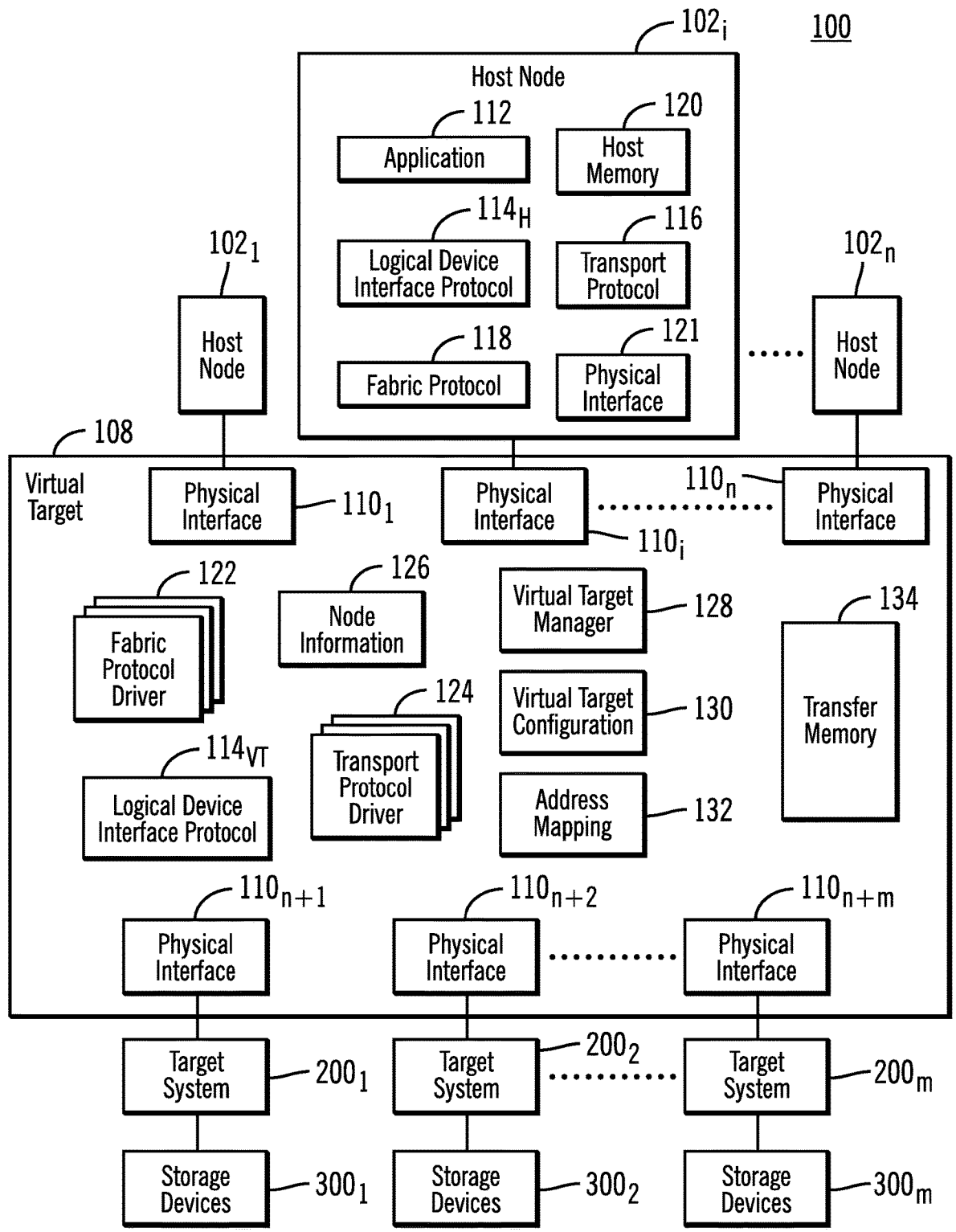
FIG. 1 illustrates an embodiment of a storage environment

A computer system may communicate read/write requests over a network to a target system managing access to multiple attached storage devices, such as SSDs. The computer system sending the NVMe request may wrap the NVMe read/write request in a network or bus protocol network packet, e.g., Peripheral Component Interconnect Express (PCIe), Remote Direct Memory Access (RDMA), Fibre Channel, etc., and transmit the network packet to a target system, which extracts the NVMe request from the network packet to process.

In NVMe environments, host nodes that communicate with target systems having different physical interfaces must include the physical interface used in each target system to which the host wants to connect.

A target system includes an NVMe subsystem with one or more controllers to manage read/write requests to namespace identifiers (NSID) defining ranges of addresses in the connected storage devices. The hosts may communicate to the NVMe subsystem over a fabric or network or a PCIe bus and port. An NVM subsystem includes one or more controllers, one or more namespaces, one or more PCIe ports, a non-volatile memory storage medium, and an interface between the controller and non-volatile memory storage medium.

Described embodiments provide a virtual target that allows host nodes and target systems using different physical interfaces and fabric protocols, and on different fabric networks, to communicate without the hosts and target systems having to have physical interfaces compatible with all the different fabric protocols being used. The virtual target system further provides a transfer memory to use to allow for direct memory access transfer of data between host nodes and target systems that are on different fabric networks using different fabric protocols and physical interfaces.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a storage environment 100 having a plurality of host nodes $102_1 \ldots 102_n$ that communicate with multiple storage devices $300_1 \ldots 300_m$ via target systems $200_1 \ldots 200_m$. The host nodes $102_1 \ldots 102_n$ may communicate with the target systems $200_1 \ldots 200_m$ via a virtual target device 108 having physical interfaces $110_1, 110_2 \ldots 110_{m+n}$ to physically connect to the host nodes $102_1 \ldots 102_n$ and target systems $200_1 \ldots 200_m$, over different fabrics, such as Fibre Channel, internet Wide Area Remote Direct Memory Access (RDMA) Protocol (iWARP), InfiniBand, RDMA over Converged Ethernet (RoCE), Ethernet, etc.

Each of the host nodes $102_1 \ldots 102_n$, include, as shown with respect to host node 102 an application 112 for generating I/O requests to the storage devices $300_1 \ldots 300_m$, a logical device interface protocol $114_H$, such as Non-Volatile Memory Express (NVMe), to form a storage I/O request for the storage devices $300_1 \ldots 300_m$, a transport protocol 116, such as a direct memory access protocol (e.g., Remote Direct Memory Access (RDMA)), for transporting the storage I/O request, and a fabric protocol 118 to transport the request over the physical interface $110_{n+1} \ldots 110_{n+m}$. The host node $102i$ further includes a host memory 120 for direct memory access operations with respect to memories in other devices and a physical interface 121 to connect to a corresponding physical interface $110_j$ in the virtual target 108.

The virtual target 108 provides a bridge between host nodes $102_1 \ldots 102_n$ and the target systems $200_1 \ldots 200_m$ that communicate using different fabric protocols. The virtual target 108 maintains different fabric protocol drivers 122 to include fabric layers in packets to communicate over the different types of physical interfaces $110_1, 110_2 \ldots 110_{m+n}$. The virtual target 108 may also maintain different transport protocol drivers 124 to transport storage I/O requests for different transport protocols, e.g., Remote Direct Memory Access (RDMA), Transmission Control Protocol/Internet Protocol (TCP/IP), etc., and a logical device interface protocol $114_{VT}$ for processing the storage I/O requests.

The virtual target further includes node information 126 providing the fabric protocol and transport protocol used by each of the nodes and host nodes $102_1 \ldots 102_n$ and target systems $200_1 \ldots 200_m$ in the storage environment 100, a virtual target manager 128 comprising the code to manage requests and communications between the host nodes $102_1 \ldots 102_n$ and target systems $200_1 \ldots 200_m$, a virtual target configuration 130 providing a mapping of storage resources and namespaces in the storage devices $300_1 \ldots 300_m$, including any subsystems and controllers in the storage devices $300_1 \ldots 300_m$, and virtual storage resources that are presented to the host nodes $102_1 \ldots 102_n$; a transfer memory 134 used to buffer data transferred between the host memory 120 and the target systems $200_1 \ldots 200_m$; and an address mapping 132 that maps host memory 120 addresses to transfer memory 134 addresses. The host nodes $102_1 \ldots 102_n$ direct storage I/O requests, in a logical device interface protocol, e.g., NVMe, to virtual storage resources. The virtual target manager 128 redirects the requests toward the physical storage resources managed by the target systems $200_1 \ldots 200_m$.

Figure 2:
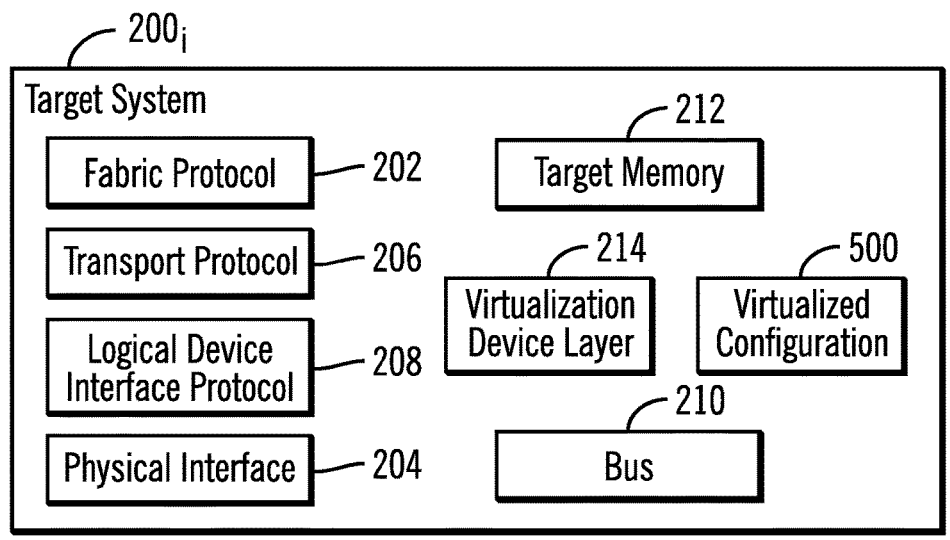
FIG. 2 illustrates an embodiment of a target system.

FIG. 2 shows the components in each target system $200_i$, such as target systems $200_1 \ldots 200_m$, as including a fabric protocol 202 to communicate through a physical interface 204 to a corresponding physical interface $110_j$ on the target 108; a transport protocol 206, such as RDMA, to process the transport commands in a received packet through the physical interfaces $110_1, 110_2 \ldots 110_m$; a logical device interface protocol 208, such as NVMe, to process a storage request in a packet communicated from the virtual target 108 and to perform read/write operations with respect to the coupled storage devices 300i; a bus 210, such as Peripheral Component Interconnect Express (PCIe), to communicate logical device interface protocol (e.g., NVMe) read/write requests to the storage devices 300i; a target memory 212 to allow for direct memory access with the transfer memory 134; and a virtual device layer 214 that generates and manages a virtualized configuration 500 of virtualized storage subsystems that provide representations of target hardware and physical namespaces to the host nodes $102_1 \ldots 102_n$, including virtual subsystem definitions, virtual controller definitions, and virtualization namespace definitions. The virtualization device layer 214 or other virtual device layer may configure virtual subsystems, virtual controllers, and virtual namespaces in the target memory 212 to represent to the attached host nodes $102_1 \ldots 102_n$, such as described with respect to FIG. 5.

Figure 3:
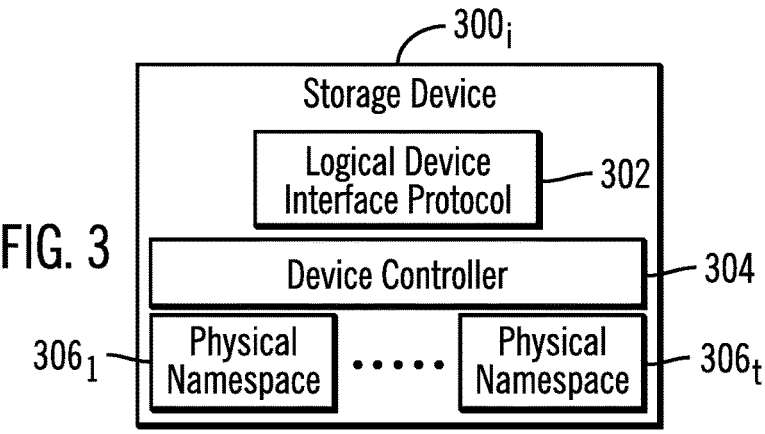
FIG. 3 illustrates an embodiment of a storage device.

FIG. 3 illustrates components in each storage device $300_i$, such as storage devices $300_1 \ldots 300_m$, including a logical device interface protocol 302 (e.g., NVMe); a device controller 304 to perform storage device $300_i$ operations, and one or more physical namespaces $306_1 \ldots 306_t$. A physical namespace comprises a quantity of non-volatile memory that may be formatted into logical blocks. When formatted, a namespace of size n is a collection of logical blocks with logical block addresses from 0 to (n−1). The namespaces may further be divided into partitions or ranges of addresses. The physical namespaces $306_1 \ldots 306_t$ are identified by a namespace identifier (NSID) used by the device controller 304 to provide access to the namespace $306_1 \ldots 306_t$.

With described embodiments, a same NVMe read/write request capsule may be transmitted from the host nodes $102_1 \ldots 102_n$ to the storage devices $300_1 \ldots 300_m$ without the need for conversion or modification. Transmitting the same storage request capsule reduces latency in transmissions between the host nodes $102_1 \ldots 102_n$ and the target systems $200_1 \ldots 200_m$ using different type physical interfaces $110_1, 110_2 \ldots 110_{m+n}$ and fabric protocols.

The host nodes $102_1 \ldots 102_n$ may further comprise any type of compute node capable of accessing storage partitions and performing compute operations.

The program components of the $102_1 \ldots 102_n$, virtual target 108, target systems $200_i$, and storage devices $300_i$ may be implemented in a software program executed by a processor of the target system 200, firmware, a hardware device, or in application specific integrated circuit (ASIC) devices, or some combination thereof.

The storage devices $300_1, 300_2 \ldots 300_m$ may comprise electrically erasable and non-volatile memory cells, such as flash storage devices, solid state drives, etc. For instance, the storage devices $300_1, 300_2 \ldots 300_m$ may comprise NAND dies of flash memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories, three bit per cell (TLC) or other number of bits per cell memories. The storage devices $300_1, 300_2 \ldots 300_m$ may also comprise, but not limited to, ferroelectric random-access memory (FeTRAM), nanowire-based non-volatile memory, three-dimensional (3D) cross-point memory, phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. The storage devices $300_1, 300_2 \ldots 300_m$ may also comprise a magnetic storage media, such as a hard disk drive etc.

The host memory 120, transfer memory 134, and target memory 212 may comprise a non-volatile or volatile memory type of device known in the art, such as a Flash Memory, a non-volatile dual in-line memory module (NVDIMM), Dynamic Random Access Memories (DRAMs), etc., or may also comprise, but not limited to, ferroelectric random-access memory (FeTRAM), nanowire-based non-volatile memory, three-dimensional (3D) cross-point memory (e.g., 3D Xpoint), phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices, such as magnetic storage media, such as a hard disk drive etc. In certain embodiments, the target system memory 136 comprises a persistent, non-volatile storage of the virtual subsystem, virtual controller, and virtual namespace definitions to provide persistent storage over power cycle events.

Figure 4:
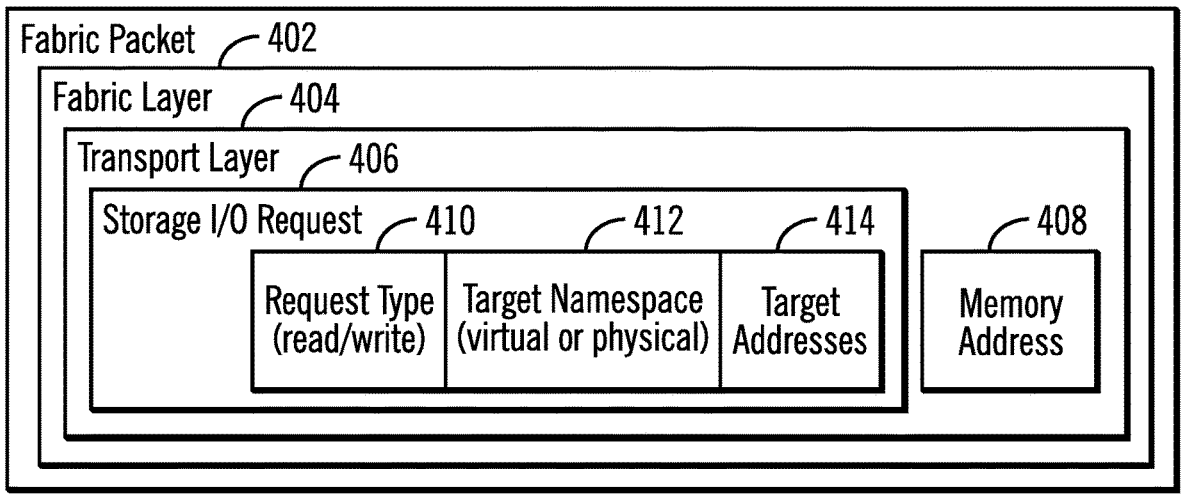
FIG. 4 illustrates an embodiment of a fabric packet.

FIG. 4 illustrates an embodiment of a fabric packet 400 for transmission across a network defined by physical interfaces $110_1, 110_2 \ldots 110_{m+n}$, and includes a fabric layer 402, including fabric information such as a header, error correction codes, source and destination addresses, and other information required for transmission through a specific physical interface type; a transport layer 404 providing commands and a format for transferring an underlying storage I/O request 406, such as a direct memory access protocol (e.g., RDMA), a packet based protocol, e.g., TCP/IP, etc. A direct memory access transport layer 404, in addition to including the storage I/O request 406, may also include a memory address 408, such as a host memory 120 address, transfer memory 134 address or target memory 212 address to allow for direct memory placement. The memory address 408 may comprise an advertised memory address and be in the form of a an RDMA memory key, byte offset and byte length in a memory region or memory window; a steering tag (STag), base address and length; or any other addressing method used to access a region of memory. The storage I/O request 406 may further include the data to transfer, not just the memory address 408 of the data, such as for in-packet data implementations.

The term "packet" as used herein refers to a formatted unit of data carried by the different fabrics or networks. The term packet as used herein can refer to any formatted unit of data for any type of fabric or network that includes the different layers and control information, including any combination of different layers, such as a transport layer, network layer, data link layer, physical layer, etc., to transmit the storage I/O request 406.

The storage I/O request 406 may comprise a capsule of an encapsulated logic device interface protocol request, including a request type command 410, e.g., read or write; a target namespace 412, which may indicate a virtual namespace ID (VNSID) or physical namespace ID (NSID) to which the request 410 is directed; and specific target addresses 414 subject to the read/write request, which may comprise one or more logical block addresses in a storage device $300_i$ which are subject to the requested read/write operation. The logic device interface protocol request 406 may include additional fields and information to process the request. Further, the storage I/O request 406 may comprise a response to a previous storage I/O request 406, such as a response to a read request or complete acknowledgment to a write request.

If the target system $200_1 \ldots 200_m$ is sending a packet 400 to transfer I/O data for a storage I/O request 406 in a previously sent packet 400 from a host node $102_1 \ldots 102_n$, then the packet 400 sent by the target system $200_i$ may not include the storage I/O request portion and just include an RDMA READ or WRITE command. When the previously sent packet 400 from the host node $102_i$ includes a storage write request 406, then the packet 400 returned by the target system $200_i$ may include an RDMA READ command to read the I/O data from the host node $102_1 \ldots 102_n$ to retrieve the data subject to the previous storage write request 406 in order to write to the storage device $300_i$. When the previously sent packet 400 includes a storage read request 406 from the host node $102_i$, then the packet 400 returned by the target system $200_i$ may include an RDMA WRITE command to write the requested I/O data from a storage device $300_i$ to the host node $102_1 \ldots 102_n$.

Figure 5:
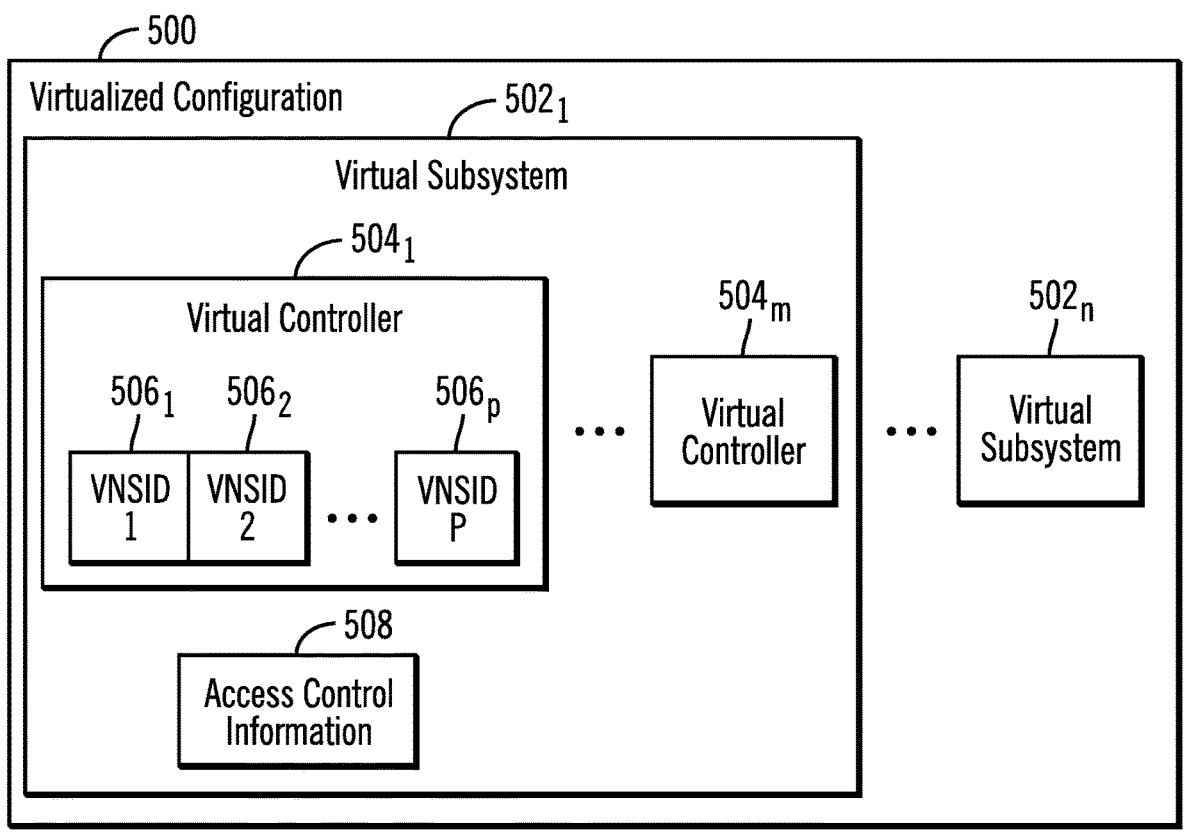
FIG. 5 illustrates an embodiment of a virtual subsystem configuration.

FIG. 5 illustrates an embodiment of a virtualized configuration 500 providing a representation of a configuration of virtual subsystems $502_1 \ldots 502_n$ in the target system 200, where each virtual subsystem $502_1 \ldots 502_n$ may include, as shown with respect to virtual subsystem $502_1$, one or more virtual controllers $504_1 \ldots 504_m$. Each virtual controller $504_1 \ldots 504_m$, as shown with respect to virtual controller $504_1$, can include one or more assigned virtual namespace identifiers (VNSID) $506_1 \ldots 506_p$. Each virtual namespace identifier $506_1 \ldots 506_p$, maps to one or more physical namespaces $306_1 \ldots 306_t$ in the storage devices $300_1 \ldots 300_m$, including a partition (range of addresses in the namespace) or the entire namespace. Each of the host nodes $102_1 \ldots 102_n$ are assigned to one or more virtual subsystems $502_1 \ldots 502_n$, and further to one or more virtual namespace IDs $506_1 \ldots 506_p$ in the virtual controllers $504_1 \ldots 504_m$ of the virtual subsystems $502_1 \ldots 502_n$ to which the host node $102_i$ is assigned. The host nodes $102_1 \ldots 102_n$ may access the physical namespace $306_1 \ldots 306_t$ partitions that map to the virtual namespace IDs $506_1 \ldots 506_p$ assigned to the hosts, where the host nodes $102_1 \ldots 102_n$ access the virtual namespace through the virtual controller $504_i$ to which the VNSID is assigned and virtual subsystem $502_i$ to which the host node is assigned. The virtual subsystems $502_i$ may include access control information 508 which indicates subsets of hosts allowed to access subsets of virtual controllers $504_1 \ldots 504_m$ and namespaces (virtual or physical).

Different configurations of the virtual subsystems shown in FIG. 5 may be provided. For instance, the VNSIDs $506_1$ and $506_2$ in the virtual controller $504_i$ may map to different partitions of a same physical namespace $120_1$ in storage device $300_1$, and/or one VNSID $506_3$ in a virtual controller $504_2$ may map to different physical namespaces $306_2$ and $306_3$ in storage device $300_2$. In this way, a write to the VNSID $400_3$ in the second virtual controller $300_2$ writes to two separate physical namespaces $306_2, 306_3$.

Additional configurations are possible. For instance, the same defined virtual namespace identifier that maps to one physical namespace may be included in two separate virtual controllers to allow for the sharing of a virtual namespace and the mapped physical namespace. Further, one virtual namespace can map to different physical namespaces or different partitions within a namespace in the same or different storage devices. A virtual namespace mapping to a physical namespace/partition may be included in multiple virtual controllers $504_i$ of one virtual subsystem to allow sharing of the virtual namespace by multiple hosts.

The virtual target 108 maintains a local copy of the virtual target configuration 130 for the virtualized configuration 600 in every connected target systems $200_1 \ldots 200_m$.

The host nodes $102_1 \ldots 102_n$ may address a virtual namespace, by including the virtual subsystem (VSS) name, the virtual controller (VC), and the virtual namespace identifier (VNSID) in a combined address, such as VSSname.VCname.VNSID. In this way, virtual namespace IDs in different virtual controllers may have the same number identifier but point to different physical namespaces/partitions. Alternatively, the same virtual namespace IDs in different virtual controllers may point to the same shared physical namespace/partition. The virtual target 108 may then map the requested virtual resources to the target system $200_i$ providing those virtualized resources and mapping to the corresponding physical resources.

FIG. 5 shows implementations of virtual subsystems and controllers. In further embodiments, some or all of the subsystems and controllers may be implemented in physical hardware components and not virtualized. In such physical implementations, the controllers may be assigned physical namespaces $306_1 \ldots 306_t$ may address a namespace using the physical namespace $306_1 \ldots 306_t$ addresses.

Figure 6A:
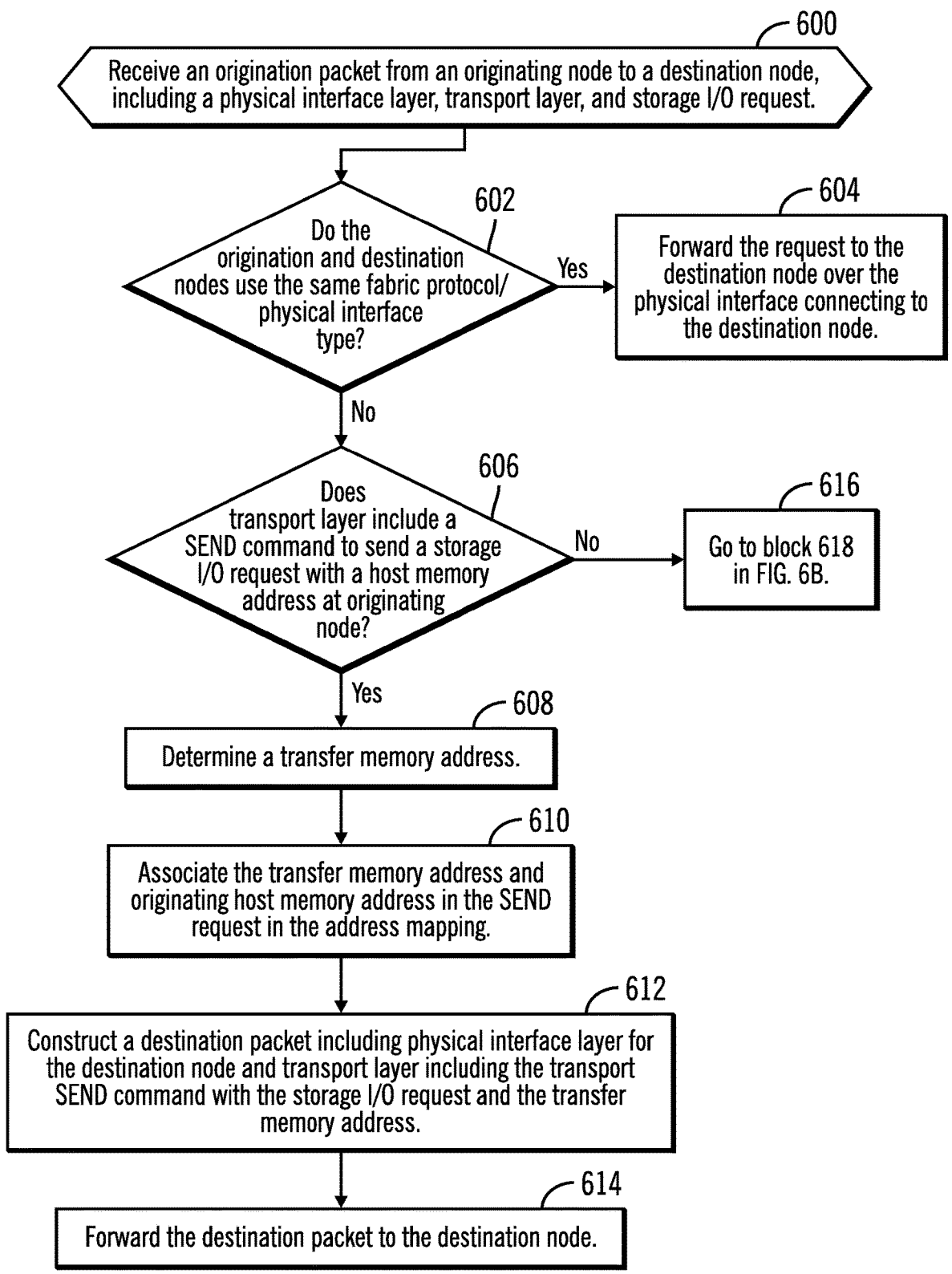
FIGS. 6a and 6b illustrate an embodiment of operations to process fabric packets between host and target systems in different fabric networks.
Figure 6B:
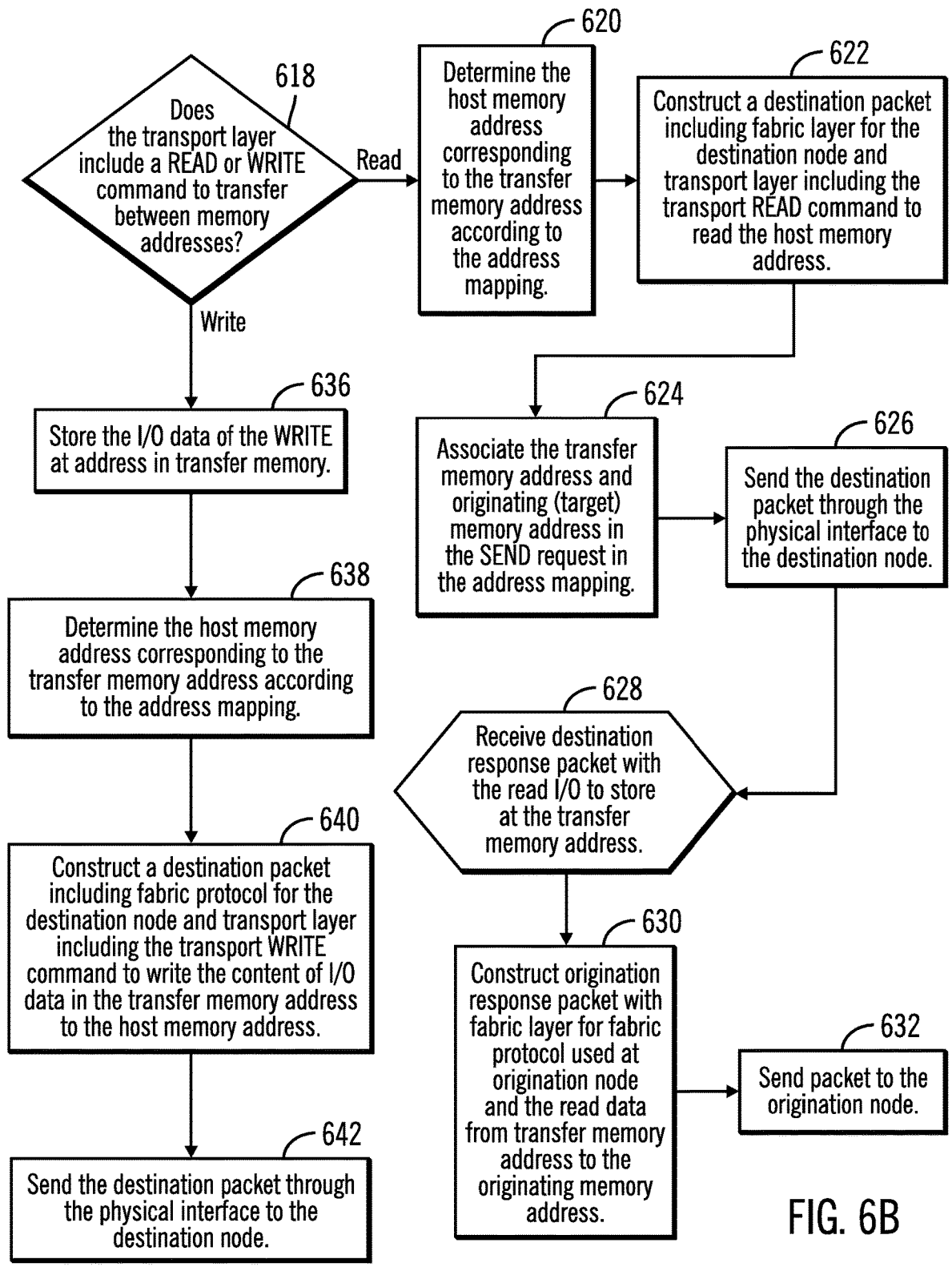

FIGS. 6a and 6b illustrate an embodiment of operations performed by the virtual target manager 128 to process a packet $400_O$ from an originating node to a destination node, such as a request comprising a packet $400_O$ with a fabric layer, 402, transport layer 404, and storage I/O request 406 from a host node $102_i$. The origination node may comprise a host node $102_1 \ldots 102_n$ transmitting a request to a target system $200_1 \ldots 200_m$ with a storage read/write request 406 or a target system $200_1 \ldots 200_m$ transmitting a command to transfer I/O data for the storage I/O request 406 in the previous packet. The destination node may comprise the target system $200_1 \ldots 200_m$ sending I/O data to the storage I/O request 406 or a host node $102_1 \ldots 102_n$ receiving the I/O data from the target system $200_1 \ldots 200_m$. Upon the virtual target 108 receiving (at block 600) an origination packet $400_O$ from an origination node, the virtual target manager 128 determines (at block 602) from the node information 126 whether the origination and destination nodes use the same physical interface type/fabric protocol. If so, then the packet $400_O$ is forwarded (at block 604) to the destination node unchanged.

If (at block 602) the origination and destination nodes use different fabric protocols to communicate on different fabric networks, then a determination is made (at block 606) as to whether the transport layer 404 includes a SEND command, such as an RDMA SEND command, to send a storage I/O request 406 with a host memory address 408 at the originating host node $102_1 \ldots 102_n$. In alternative embodiments, the transport layer 404 may utilize different transport protocols other than RDMA. The virtual target manager 128 determines (at block 608) a transfer memory 134 address to use for the I/O data being transferred via direct memory access between memory addresses as part of the storage I/O request 406. The determined transfer memory 134 address is associated (at block 610) in the address mapping 132 with the originating host memory address 408 in the SEND request in the transport layer 404.

The virtual target manager 128 constructs (at block 612) a destination packet $400_D$ including a fabric layer 402 for the destination node, which uses a different fabric protocol than the fabric layer 402 used in the origination packet $400_O$, and transport layer 404 including the transport SEND command with the storage I/O request 406 capsule and the transfer memory 134 address as the memory address 408, to substitute the transfer memory 134 address for the host memory 120 address included in the origination packet $400_O$. The destination packet $400_D$ is forwarded (at block 614) to the destination node via the physical interface physical interface $110_{n+1}, 110_{n+2} \ldots 110_{m+n}$ of the destination node.

If (at block 606) the transport layer 404 does not include a SEND command, then control proceeds (at block 616) to block 618 in FIG. 6b. At block 618, the virtual target manager 128 determines whether the transport layer 404 includes a READ or WRITE command, which would be sent by a target system $200_1 \ldots 200_m$ as a response to a storage I/O request 406 in the origination packet $400_O$. If (at block 618) the transport layer 404 includes a READ request, such as an RDMA READ, to access the data to write to the storage device $300_i$, then the virtual target manager 128 determines (at block 620) the host memory 120 address corresponding to the transfer memory 134 address according to the address mapping 132. A destination packet $400_D$ is constructed (at block 622) including the fabric layer 402 for the destination node (e.g., target system $200_1 \ldots 200m$) and a transport layer 404 including the transport READ command to read the host memory 120 address, which may be indicated in the memory address field 408. The destination packet $400_D$ may not include a storage I/O request layer 406 because the destination packet $400_D$ is being used to transmit the I/O data for the previously sent storage I/O request 406. The transfer memory 134 address and the target memory 212 address may be associated (at block 624) in the address mapping 132. The destination packet $400_D$ is sent (at block 626) through a host physical interface $110_1, 110_2 \ldots 110_n$ to the host node $102_i$ that initiated the storage I/O request 406. In this way, the host memory 120 address is substituted for the transfer memory 134 address in the received packet.

Upon receiving (at block 628) at the virtual target 108 a destination response packet $400_{DR}$ to the READ command in the transport layer 404 of the destination packet $400_D$ with the read I/O data to store at the transfer memory 134 address, the virtual target manager 128 constructs (at block 630) an origination response packet $400_{OR}$ with the origination node fabric protocol and the read I/O data from the transfer memory 134 address to the originating (target) memory 212 address. The constructed packet $400_{OR}$ with the read I/O data, being returned for a storage write request 406, is sent (at block 632) to the origination node, which may comprise the target systems $200_i$ to store the read data in the target address 414 of the storage write request 406 in a storage device $300_i$.

If (at block 618) the transport layer 404 of the origination packet $404_O$ includes a WRITE request, such as an RDMA WRITE, to return the data requested in the storage I/O request 406 at the target address 414 of the storage device 300 then the virtual target manager 128 stores (at block 636) the I/O data of the RDMA WRITE request in an address in the transfer memory 134, which would comprise the memory address 408 included in the destination packet $400_D$ constructed at block 612. The virtual target manager 128 determines (at block 638) the host memory 120 address corresponding to the transfer memory 134 according to the address mapping 132. A destination packet $400_D$ is constructed (at block 640) including fabric protocol in the fabric layer 402 for the destination node and a transport layer including the transport WRITE command to write the content of the I/O data in the transfer memory 134 address to the host memory 120 address. The destination packet $400_D$ is sent (at block 642) through the physical interfaces $110_i$ to the destination node, which may be host node $102_i$ originating the packet 400 with the storage I/O request 406.

With the described embodiments of FIGS. 6a and 6b, the virtual target manager 128 allows for transmission of packets between different fabric types, such as different networks, by constructing a new packet using the fabric layer protocol of the destination node and using the transfer memory in the virtual target 108 to buffer data being transferred between the origination and destination nodes. Further, with the described embodiments, when transmitting a SEND command in the transport layer, the capsule including the storage I/O request 406 is not modified and passed unchanged through the different packets constructed to allow transmission through different fabric layer types having different physical interface configurations.

Figure 7:
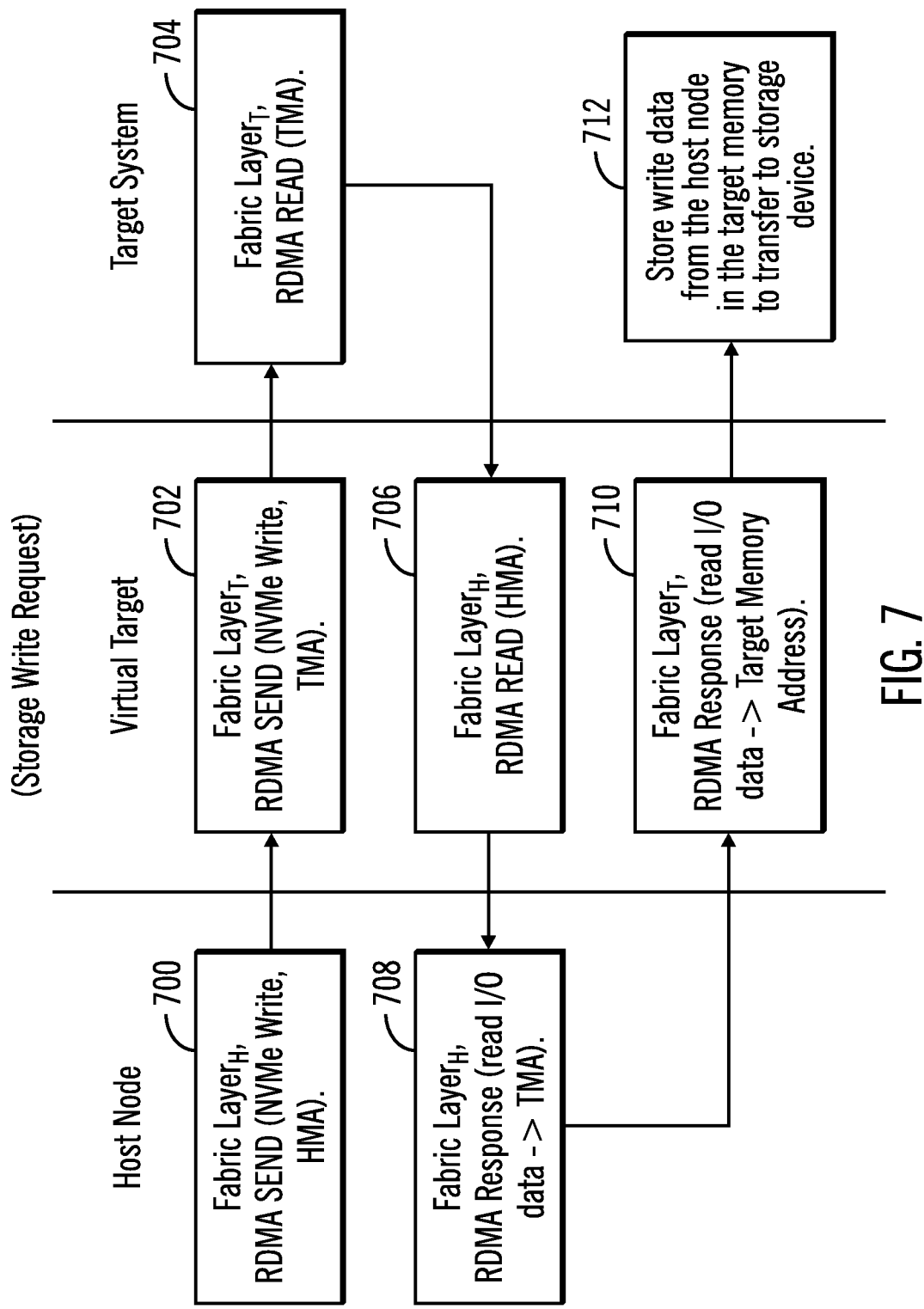
FIG. 7 illustrates an embodiment of packet flow for a storage write request.

FIG. 7 illustrates an embodiment of the flow of a write request through a virtual target 108, wherein the host node $102_i$ initiates operations by generating a packet 700 including a Fabric Layer $404_H$ of the host node $102_i$ with an RDMA send command including a capsule 406 having an NVMe write to a target address 414 with a host memory 120 address (HMA) having the write data for the NVMe write request. Upon receiving this packet 700, the virtual target 108 generates a packet 702 including a Fabric Layer $402_T$ for the target system $200_i$ managing the storage device $300_i$ to which the NVMe write 406 is directed and a transfer memory 134 address (TMA) associated with the host memory 120 address (HMA). Upon the target system $200_i$ receiving the packet 702, the target system 200$_i$ constructs a packet 704 including the Fabric Layer 402$_T$ for the target system 200$_i$ and an RDMA read to the transfer memory 134 address (TMA) to read the data of the NVMe write 406 from the host memory 120 to store in the storage device 300$_i$. Upon the virtual target 108 receiving packet 704, a packet 706 is constructed having the host Fabric Layer 402$_H$ and an RDMA read to the host memory 120 address (HMA) mapping to the transfer memory 134 address (TMA) in the packet 704.

When the host receives the packet 706 with the RDMA read request in the transport layer 404, the host 102$_i$ constructs a packet 708 having the host Fabric Layer 402$_H$ and an RDMA response in the transport layer 404 including the read I/O data to write and the transfer memory 134 address (TMA) to place the data. The virtual target 108 upon receiving packet 708 with the returned I/O data, constructs a packet 710 having the target system Fabric Layer 402$_T$ with the response to the read with the read I/O data to send to the target memory 212 address. Upon receiving the packet 710, the target system 200$_i$ stores (at block 712) the I/O data from the host node 102$_i$ for the original write request in the target memory 212 for transfer to the storage device 300$_i$ to complete the initial write request.

Figure 8:
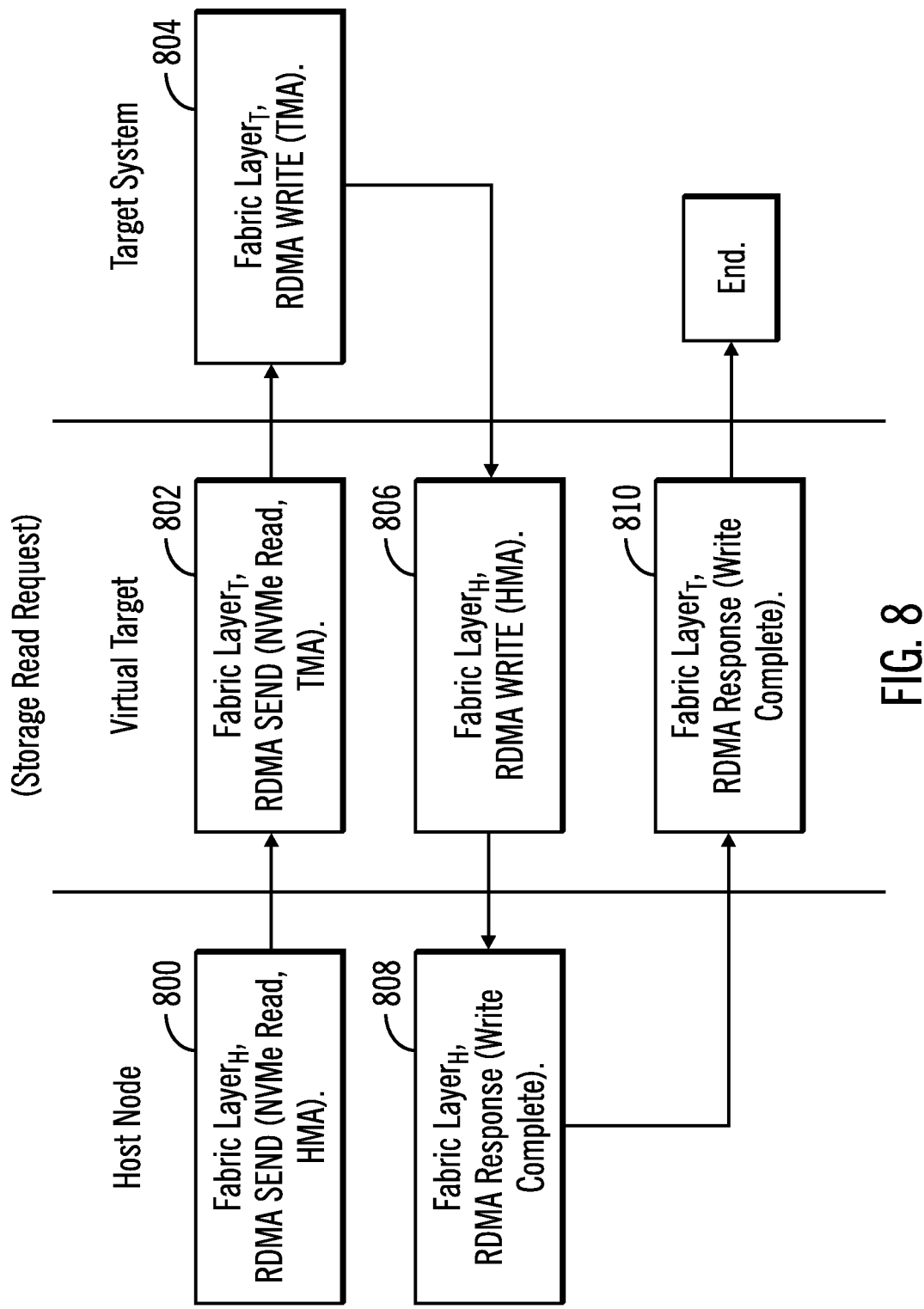
FIG. 8 illustrates an embodiment of packet flow for a storage read request.

FIG. 8 illustrates an example of the flow of a read request through a virtual target 108, wherein the host node 102$_i$ initiates operations by generating a packet 800 including a Fabric Layer 404$_H$ of the host node 102$_i$ with an RDMA SEND command including a capsule 406 having an NVMe read to a target address 414 with a host memory 120 address (HMA) to which to return the I/O data for the NVMe read request. Upon receiving this packet 800, the virtual target 108 generates a packet 802 including a Fabric Layer 402$_T$ for the target system 200$_i$ managing the storage device 300$_i$ to which the NVMe read 406 is directed and a transfer memory 134 address (TMA) associated with the host memory 120 address (HMA). Upon the target system 200$_i$ receiving the packet 802, the target system 200$_i$ constructs a packet 804 including the Fabric Layer 402$_T$ for the target system 200$_i$ and an RDMA write to the transfer memory 134 address (TMA) to return the data read for the NVMe read 406 to the host node 102$_i$. Upon the virtual target 108 receiving packet 804, a packet 806 is constructed having the host Fabric Layer 402$_H$ and an RDMA write in the transport layer 404 to the host memory 120 address (HMA) mapping to the transfer memory 134 address (TMA) in the packet 804.

When the host 102$_i$ receives the packet 806 with the RDMA write and I/O data in the transport layer 404, the host 102$_i$ accepts the read I/O data and constructs a response packet 708 having the host Fabric Layer 402$_H$ and an RDMA response in the transport layer 404 indicating that the RDMA write to transfer the read I/O data completed. The virtual target 108 upon receiving response packet 808 with the complete response for the RDMA write, constructs a packet 810 having the target system Fabric Layer 402$_T$ with the complete response to the RDMA read. Upon receiving the packet 810, the target system 200$_i$ ends processing of the RDMA write.

With the described packet flow of FIGS. 7 and 8, packets are allowed to be sent through different fabrics by having an intermediary virtual target that has different physical interfaces 110$_1$, 110$_2$ . . . 110$_{m+n}$ for different fabric network types. The virtual target 108 may receive a packet on one fabric network and construct a packet to forward to a destination node in a different fabric network. The virtual target may use a transfer memory to allow direct memory data placement between the memories of the host node and target system on different fabric networks using different fabric protocols and physical interface types. Further, latency is reduced by transporting the capsule NVMe request unchanged through the different packets and networks.

The flow of FIGS. 7 and 8 were described using RDMA as the transport layer protocol and NVMe as the logical storage interface protocol. In alternative embodiments, different protocols may be used for the transport layer and storage layer with the storage I/O request. For instance, in one implementation, the host node 102$_i$ and target system 200$_i$ may communicate using different variants of the RDMA transport layer, such as iWARP and InfiniBand. In a still further embodiment, the host node 102$_i$ and target system 200$_i$ may communicate using entirely different protocols, such as RDMA versus Fibre Channel. Other variants that may be similar or different may also be used by the host nodes and target systems.

The described operations of the processing components, such as components in the host node 102$_i$, including 112, 114, 116, 118, in the virtual target 108, including 122, 124, 126, 114$_{VT}$, 128, 130, 132, in the target system 200$_i$, including 202, 206, 208, 212, 214, 600, and in the storage device 300 including 302, 304, and other components, may be implemented as a method, apparatus, device, computer product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

Figure 9:
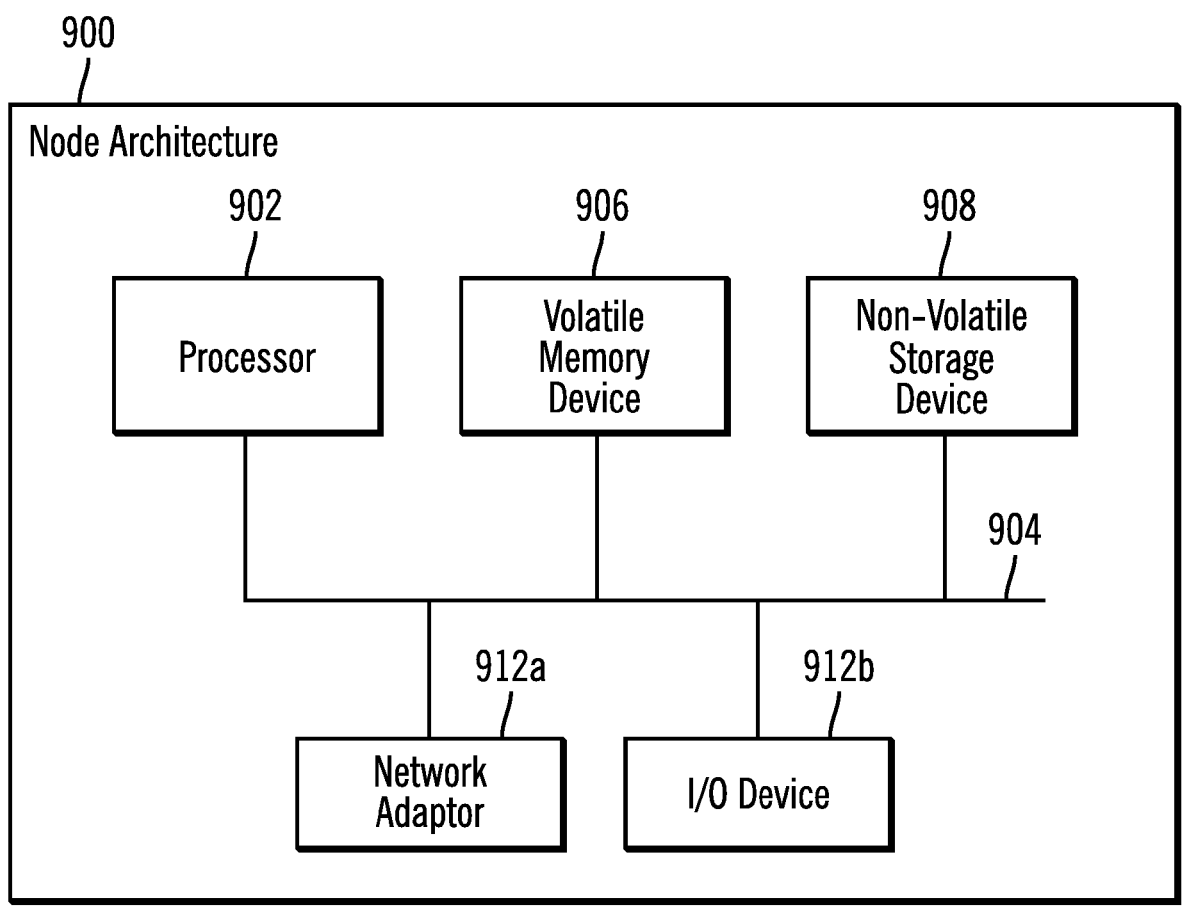
FIG. 9 illustrates an embodiment of a computer node architecture in which components may be implemented

FIG. 9 illustrates an embodiment of a computer node architecture 2200, such as the components included in the host nodes $102_1, 102_2 \ldots 102_n$, the virtual target 108, and the target systems $200_1 \ldots 200_m$, including a processor 902 that communicates over a bus 904 with a volatile memory device 906 in which programs, operands and parameters being executed are cached, and a non-volatile storage device 904, such as target system memory 136. The bus 904 may comprise multiple buses. Further, the bus 904 may comprise a multi-agent bus or not be a multi-agent bus, and instead provide point-to-point connections according to PCIe architecture. The processor 902 may also communicate with Input/output (I/O) devices 912a, 912b, which may comprise input devices, display devices, graphics cards, ports, network interfaces, etc. The network adaptor 912a may comprise the physical interfaces $110_1, 110_2 \ldots 110_{m+n}$. For the host nodes $102_1, 102_2 \ldots 102_n$ and the virtual target 108, the virtual storage resources may also appear on the bus 904 as bus components.

In certain embodiments, the computer node architecture 900 may comprise a personal computer, server, mobile device or embedded compute device. In a silicon-on-chip (SOC) implementation, the architecture 900 may be implemented in an integrated circuit die. In certain implementations, the architecture 900 may not include a PCIe bus to connect to NVMe storage devices, and instead include a network adaptor to connect to a fabric or network and send communications using the NVMe interface to communicate with the target systems $200_1 \ldots 200_m$ to access underlying storage devices $300_1 \ldots 300_m$.

The reference characters used herein, such as i, m, n, and t are used to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following examples pertain to further embodiments.

Example 1 is a computer program product for allowing a host and a storage device to communicate between different fabrics, including a computer readable storage media in communication with nodes over a network, wherein the computer readable storage media includes program code executed by at least one processor to: receive an origination packet from an originating node over a first network to a destination node having a storage device, wherein the origination packet includes a first fabric layer for transport through the first network, a command in a transport protocol with a storage Input/Output (I/O) request, with respect to the storage device at the destination node, and a host memory address; determine a transfer memory address to map to the host memory address; construct a destination packet including a second fabric layer for transport through a second network and the command in the transport protocol to send the storage I/O request and the transfer memory address, wherein different first and second fabric protocols are used to communicate on the first and second networks, respectively; and send the destination packet over the second network to the destination node to perform the storage I/O request with respect to the storage device.

In Example 2, the subject matter of examples 1 and 3-11 can optionally include that the program code is further executed to: receive, from the destination node, a first I/O request in the transport protocol to transfer I/O data for the storage I/O request with respect to the host memory address; buffer the I/O data in the transfer memory address when processing the direct data placement command; and transmit a second I/O request in the transport protocol to transfer the I/O data in the transfer memory address to the host memory address or a target memory address in the destination node.

In Example 3, the subject matter of examples 1, 2 and 4-11 can optionally include that the first and second I/O requests in the transport protocol comprises first and second read requests in the transport protocol when the storage I/O request comprises a write request, and wherein the first and second I/O requests in the transport protocol comprises a first and second write requests in the transport protocol when the storage I/O request comprises a read request.

In Example 4, the subject matter of examples 1-3 and 5-11 can optionally include that the storage I/O request comprises a storage write request to write I/O data from the origination node to a target memory address in the destination node, wherein the program code is further executed to: receive from the destination node a first read request in the transport protocol to read I/O data from the transfer memory address; determine the host memory address that maps to the transfer memory address in the first read request; and transmit to the origination node a second read request in the transport protocol to read the I/O data from the determined host memory address.

In Example 5, the subject matter of examples 1-4 and 6-11 can optionally include that the program code is further executed to: receive the I/O data from the host memory address in a first response, in the transport protocol, to the second read request; store the received I/O data in the transfer memory address; and transmit the I/O data from the transfer memory address to the destination node in a second response, in the transport protocol, to the first read request.

In Example 6, the subject matter of examples 1-5 and 7-11 can optionally include that the storage I/O request comprises a storage read request to read I/O data from the storage device wherein the program code is further executed to: receive a first write request, in the transport protocol, from the destination node, to write I/O data to the transfer memory address in response to the storage read request; store the I/O data in the transfer memory address; determine the host memory address that maps to the transfer memory address; and send a second write request, in the transport protocol, to the origination node to write the I/O data from the transfer memory address to the determined host memory address.

In Example 7, the subject matter of examples 1-6 and 8-11 can optionally include that the program code is further to: interface with a plurality of physical interfaces connecting to host nodes and target systems, wherein the physical interfaces use different fabric protocols to communicate on different types of networks, including the first and second fabric protocols and the first and second networks, respectively.

In Example 8, the subject matter of examples 1-7 and 9-11 can optionally include that the computer program product is deployed in a virtual target system and the program code is further to: provide a representation of storage resources in storage devices at target systems as virtual target resources to host nodes and a mapping of the virtual target resources to the storage resources in the storage devices at target systems, wherein the storage device to which the storage I/O request is directed comprises one of the virtual target resources and wherein the sending of the destination packet comprises sending to the target system having the storage resources that map to the virtual target resources according to the mapping.

In Example 9, the subject matter of examples 1-8 and 10-11 can optionally include that the storage I/O request comprises a Non-volatile Memory Express (NVMe) protocol request, and wherein the transport protocol comprises a Remote Direct Memory Access (RDMA) protocol.

In Example 10, the subject matter of examples 1-9 and 11 can optionally include that the storage I/O request is transferred unmodified from the origination node to the destination node through the origination packet and the destination packet.

In Example 11, the subject matter of examples 1-10 can optionally include that the program code is further executed to: determine whether the origination node and the destination node use a same fabric protocol to communicate, wherein the determining the transfer memory address in response to receiving the origination packet, the constructing the destination packet, and the sending the destination packet are performed in response to determining that the origination node and the destination node use different first and second fabric protocols to communicate on the first and second networks, respectively; and send the origination packet unchanged to the destination node in response to determining the origination and destination nodes use the same physical interface protocol to communicate.

Example 12 is a system for allowing a host and a storage device to communicate between different fabrics, in communication with nodes over a network, comprising: a processor; and a computer readable storage media including program code executed by the processor to: receive an origination packet from an originating node over a first network to a destination node having a storage device, wherein the origination packet includes a first fabric layer for transport through the first network, a command in a transport protocol with a storage Input/Output (I/O) request, with respect to the storage device at the destination node, and a host memory address; determine a transfer memory address to map to the host memory address; construct a destination packet including a second fabric layer for transport through a second network and the command in the transport protocol to send the storage I/O request and the transfer memory address, wherein different first and second fabric protocols are used to communicate on the first and second networks, respectively; and send the destination packet over the second network to the destination node to perform the storage I/O request with respect to the storage device.

In Example 13, the subject matter of examples 12 and 14-18 can optionally include that the program code is further executed to: receive, from the destination node, a first I/O request in the transport protocol to transfer I/O data for the storage I/O request with respect to the host memory address; buffer the I/O data in the transfer memory address when processing the direct data placement command; and transmit a second I/O request in the transport protocol to transfer the I/O data in the transfer memory address to the host memory address or a target memory address in the destination node.

In Example 14, the subject matter of examples 12, 13 and 15-18 can optionally include that the first and second I/O requests in the transport protocol comprises first and second read requests in the transport protocol when the storage I/O request comprises a write request, and wherein the first and second I/O requests in the transport protocol comprises a first and second write requests in the transport protocol when the storage I/O request comprises a read request.

In Example 15, the subject matter of examples 12-14 and 16-18 can optionally include that the storage I/O request comprises a storage write request to write I/O data from the origination node to a target memory address in the destination node, wherein the program code is further executed to: receive from the destination node a first read request in the transport protocol to read I/O data from the transfer memory address; determine the host memory address that maps to the transfer memory address in the first read request; and transmit to the origination node a second read request in the transport protocol to read the I/O data from the determined host memory address.

In Example 16, the subject matter of examples 12-15 and 17-18 can optionally include that the program code is further executed to: receive the I/O data from the host memory address in a first response, in the transport protocol, to the second read request;
store the received I/O data in the transfer memory address; and transmit the I/O data from the transfer memory address to the destination node in a second response, in the transport protocol, to the first read request.

In Example 17, the subject matter of examples 12-16 and 18 can optionally include that the storage I/O request comprises a storage read request to read I/O data from the storage device wherein the program code is further executed to: receive a first write request, in the transport protocol, from the destination node, to write I/O data to the transfer memory address in response to the storage read request; store the I/O data in the transfer memory address; determine the host memory address that maps to the transfer memory address; and send a second write request, in the transport protocol, to the origination node to write the I/O data from the transfer memory address to the determined host memory address.

In Example 18, the subject matter of examples 12-17 can optionally include that the storage I/O request is transferred unmodified from the origination node to the destination node through the origination packet and the destination packet.

Example 19 is a method for allowing a host and a storage device to communicate between different fabrics and for communicating with nodes over a network, comprising: receiving an origination packet from an originating node over a first network to a destination node having a storage device, wherein the origination packet includes a first fabric layer for transport through the first network, a command in a transport protocol with a storage Input/Output (I/O) request, with respect to the storage device at the destination node, and a host memory address; determining a transfer memory address to map to the host memory address; constructing a destination packet including a second fabric layer for transport through a second network and the command in the transport protocol to send the storage I/O request and the transfer memory address, wherein different first and second fabric protocols are used to communicate on the first and second networks, respectively; and sending the destination packet over the second network to the destination node to perform the storage I/O request with respect to the storage device.

In Example 20, the subject matter of examples 19 and 21-25 can optionally include receiving, from the destination node, a first I/O request in the transport protocol to transfer I/O data for the storage I/O request with respect to the host memory address; buffering the I/O data in the transfer memory address when processing the direct data placement command; and transmitting a second I/O request in the transport protocol to transfer the I/O data in the transfer memory address to the host memory address or a target memory address in the destination node.

In Example 21, the subject matter of examples 19, 20 and 21-25 can optionally include that the first and second I/O requests in the transport protocol comprises first and second read requests in the transport protocol when the storage I/O request comprises a write request, and wherein the first and second I/O requests in the transport protocol comprises a first and second write requests in the transport protocol when the storage I/O request comprises a read request.

In Example 22, the subject matter of examples 19-21 and 23-25 can optionally include that the storage I/O request comprises a storage write request to write I/O data from the origination node to a target memory address in the destination node, further comprising: receiving from the destination node a first read request in the transport protocol to read I/O data from the transfer memory address; determining the host memory address that maps to the transfer memory address in the first read request; and transmitting to the origination node a second read request in the transport protocol to read the I/O data from the determined host memory address.

In Example 23, the subject matter of examples 19-22 and 24-25 can optionally include receiving the I/O data from the host memory address in a first response, in the transport protocol, to the second read request; storing the received I/O data in the transfer memory address; and transmitting the I/O data from the transfer memory address to the destination node in a second response, in the transport protocol, to the first read request.

In Example 24, the subject matter of examples 19-23 and 25 can optionally include that the storage I/O request comprises a storage read request to read I/O data from the storage device, further comprising: receiving a first write request, in the transport protocol, from the destination node, to write I/O data to the transfer memory address in response to the storage read request; storing the I/O data in the transfer memory address; determining the host memory address that maps to the transfer memory address; and sending a second write request, in the transport protocol, to the origination node to write the I/O data from the transfer memory address to the determined host memory address.

In Example 25, the subject matter of examples 19-24 can optionally include that the storage I/O request is transferred unmodified from the origination node to the destination node through the origination packet and the destination packet.

Example 26 is a machine readable medium including code, when executed, to cause a machine to perform the method of any one of examples 19-25.

Example 27 is an apparatus for allowing a host and a storage device to communicate between different fabrics and for communicating with nodes over a network, comprising: means for receiving an origination packet from an originating node over a first network to a destination node having a storage device, wherein the origination packet includes a first fabric layer for transport through the first network, a command in a transport protocol with a storage Input/Output (I/O) request, with respect to the storage device at the destination node, and a host memory address; means for determining a transfer memory address to map to the host memory address; means for constructing a destination packet including a second fabric layer for transport through a second network and the command in the transport protocol to send the storage I/O request and the transfer memory address, wherein different first and second fabric protocols are used to communicate on the first and second networks, respectively; and means for sending the destination packet over the second network to the destination node to perform the storage I/O request with respect to the storage device.

Example 28 is an apparatus comprising means to perform a method as claimed in any preceding example.

Example 29 is a machine-readable storage including machine-readable instructions, when executed, to implement a method or realize an apparatus as claimed in any preceding example.

Example 30 is an apparatus for allowing a host and a storage device to communicate between different fabrics and in communication with nodes over a network, including program code executed by at least one processor to: receive an origination packet from an originating node over a first network to a destination node having a storage device, wherein the origination packet includes a first fabric layer for transport through the first network, a command in a transport protocol with a storage Input/Output (I/O) request, with respect to the storage device at the destination node, and a host memory address; determine a transfer memory address to map to the host memory address; construct a destination packet including a second fabric layer for transport through a second network and the command in the transport protocol to send the storage I/O request and the transfer memory address, wherein different first and second fabric protocols are used to communicate on the first and second networks, respectively; and send the destination packet over the second network to the destination node to perform the storage I/O request with respect to the storage device.

In Example 31, the subject matter of examples 30 and 32-40 can optionally include that the program code is further executed to: receive, from the destination node, a first I/O request in the transport protocol to transfer I/O data for the storage I/O request with respect to the host memory address; buffer the I/O data in the transfer memory address when processing the direct data placement command; and transmit a second I/O request in the transport protocol to transfer the I/O data in the transfer memory address to the host memory address or a target memory address in the destination node.

In Example 32, the subject matter of examples 30, 31 and 33-40 can optionally include that the first and second I/O requests in the transport protocol comprises first and second read requests in the transport protocol when the storage I/O request comprises a write request, and wherein the first and second I/O requests in the transport protocol comprises a first and second write requests in the transport protocol when the storage I/O request comprises a read request.

In Example 33, the subject matter of examples 30-32 and 34-40 can optionally include that the storage I/O request comprises a storage write request to write I/O data from the origination node to a target memory address in the destination node, wherein the program code is further executed to: receive from the destination node a first read request in the transport protocol to read I/O data from the transfer memory address; determine the host memory address that maps to the transfer memory address in the first read request; and transmit to the origination node a second read request in the transport protocol to read the I/O data from the determined host memory address.

In Example 34, the subject matter of examples 30-33 and 35-40 can optionally include that the program code is further executed to: receive the I/O data from the host memory address in a first response, in the transport protocol, to the second read request; store the received I/O data in the transfer memory address; and transmit the I/O data from the transfer memory address to the destination node in a second response, in the transport protocol, to the first read request.

In Example 35, the subject matter of examples 30-34 and 36-40 can optionally include that the storage I/O request comprises a storage read request to read I/O data from the storage device wherein the program code is further executed to: receive a first write request, in the transport protocol, from the destination node, to write I/O data to the transfer memory address in response to the storage read request; store the I/O data in the transfer memory address; determine the host memory address that maps to the transfer memory address; and send a second write request, in the transport protocol, to the origination node to write the I/O data from the transfer memory address to the determined host memory address.

In Example 36, the subject matter of examples 30-35 and 37-40 can optionally include that the program code is further to: interface with a plurality of physical interfaces connecting to host nodes and target systems, wherein the physical interfaces use different fabric protocols to communicate on different types of networks, including the first and second fabric protocols and the first and second networks, respectively.

In Example 37, the subject matter of examples 30-36 and 38-40 can optionally include that the apparatus is deployed in a virtual target system and the program code is further to: provide a representation of storage resources in storage devices at target systems as virtual target resources to host nodes and a mapping of the virtual target resources to the storage resources in the storage devices at target systems, wherein the storage device to which the storage I/O request is directed comprises one of the virtual target resources and wherein the sending of the destination packet comprises sending to the target system having the storage resources that map to the virtual target resources according to the mapping.

In Example 38, the subject matter of examples 30-37 and 39-40 can optionally include that the storage I/O request comprises a Non-volatile Memory Express (NVMe) protocol request, and wherein the transport protocol comprises a Remote Direct Memory Access (RDMA) protocol.

In Example 39, the subject matter of examples 30-38 and 40 can optionally include that the storage I/O request is transferred unmodified from the origination node to the destination node through the origination packet and the destination packet.

In Example 40, the subject matter of examples 30-39 can optionally include that the program code is further executed to: determine whether the origination node and the destination node use a same fabric protocol to communicate, wherein the determining the transfer memory address in response to receiving the origination packet, the constructing the destination packet, and the sending the destination packet are performed in response to determining that the origination node and the destination node use different first and second fabric protocols to communicate on the first and second networks, respectively; and send the origination packet unchanged to the destination node in response to determining the origination and destination nodes use the same physical interface protocol to communicate.

What is claimed:

1. A computer program product including a a non-transistory computer readable storage media in communication with nodes, wherein the computer readable storage media includes program code executed by at least one processor in a system to:

communicate with an originating node over a first network and communicating with a destination node over a second network;

receive an origination packet from the originating node over the first network to the destination node having a storage device, wherein the origination packet includes a first fabric layer for transport through the first network, a command in a transport protocol with a storage Input/Output (I/O) request, with respect to the storage device at the destination node, and a host memory address at the originating node;

determine a transfer memory address of a location in a memory device to map to the host memory address, wherein the memory device is in the system that is separate from the storage device and wherein the system is in communication with the storage device via the second network;

construct a destination packet including a second fabric layer for transport through the second network and the command in the transport protocol to send the storage I/O request and the transfer memory address, wherein different first and second fabric protocols are used to communicate on the first and second networks, respectively; and send the destination packet over the second network to the destination node to perform the storage I/O request with respect to the storage device.

2. The computer program product of claim 1, wherein the program code is further executed to:
receive, from the destination node, a first I/O request in the transport protocol to transfer I/O data for the storage I/O request with respect to the host memory address;
buffer the I/O data in the transfer memory address when processing a direct data placement command; and
transmit a second I/O request in the transport protocol to transfer the I/O data in the transfer memory address to the host memory address or a target memory address in the destination node.

3. The computer program product of claim 2, wherein the first and second I/O requests in the transport protocol comprise first and second read requests in the transport protocol when the storage I/O request comprises a write request, and wherein the first and second I/O requests in the transport protocol comprise a first and second write requests in the transport protocol when the storage I/O request comprises a read request.

4. The computer program product of claim 1, wherein the storage I/O request comprises a storage write request to write I/O data from the originating node to a target memory address in the destination node, wherein the program code is further executed to:
receive from the destination node a first read request in the transport protocol to read I/O data from the transfer memory address;
determine the host memory address that maps to the transfer memory address in the first read request; and
transmit to the originating node a second read request in the transport protocol to read the I/O data from the determined host memory address.

5. The computer program product of claim 4, wherein the program code is further executed to:
receive the I/O data from the host memory address in a first response, in the transport protocol, to the second read request;
store the received I/O data in the transfer memory address; and
transmit the I/O data from the transfer memory address to the destination node in a second response, in the transport protocol, to the first read request.

6. The computer program product of claim 1, wherein the storage I/O request comprises a storage read request to read I/O data from the storage device wherein the program code is further executed to:
receive a first write request, in the transport protocol, from the destination node, to write I/O data to the transfer memory address in response to the storage read request;
store the I/O data in the transfer memory address;
determine the host memory address that maps to the transfer memory address; and
send a second write request, in the transport protocol, to the originating node to write the I/O data from the transfer memory address to the determined host memory address.

7. The computer program product of claim 1, wherein the program code is further to:
interface with a plurality of physical interfaces connecting to the originating and destination nodes, wherein the physical interfaces use different fabric protocols to communicate on different types of networks, including the first and second fabric protocols and the first and second networks, respectively.

8. The computer program product of claim 7, wherein the system comprises a virtual target system, and the program code is further to:
provide a representation of storage resources in storage devices at target systems as virtual target resources to host nodes and a mapping of the virtual target resources to the storage resources in the storage devices at target systems, wherein the storage device to which the storage I/O request is directed comprises one of the virtual target resources and wherein the sending of the destination packet comprises sending to the target system having the storage resources that map to the virtual target resources according to the mapping.

9. The computer program product of claim 1, wherein the storage I/O request comprises a Non-volatile Memory Express (NVMe) protocol request, and wherein the transport protocol comprises a Remote Direct Memory Access (RDMA) protocol.

10. The computer program product of claim 1, wherein the storage I/O request is transferred unmodified from the originating node to the destination node through the origination packet and the destination packet.

11. The computer program product of claim 1, wherein the program code is further executed to:
determine whether the originating node and the destination node use a same fabric protocol to communicate, wherein the determining the transfer memory address in response to receiving the origination packet, the constructing the destination packet, and the sending the destination packet are performed in response to determining that the originating node and the destination node use different first and second fabric protocols to communicate on the first and second networks, respectively; and
send the origination packet unchanged to the destination node in response to determining the originating and destination nodes use the same fabric protocol to communicate.

12. A system in communication with nodes, comprising:
a processor; and
a non-transistory computer readable storage media including program code executed by the processor to:
communicate with an originating node over a first network and communicating with a destination node over a second network;
receive an origination packet from the originating node over the first network to the destination node having a storage device, wherein the origination packet includes a first fabric layer for transport through the first network, a command in a transport protocol with a storage Input/Output (I/O) request, with respect to the storage device at the destination node, and a host memory address at the originating node;
determine a transfer memory address of a location in a memory device in a target device to map to the host memory address, wherein the memory device is in the system that is separate from the storage device and wherein the system is in communication with the storage device via the second network;
construct a destination packet including a second fabric layer for transport through the second network and the command in the transport protocol to send the storage I/O request and the transfer memory address, wherein different first and second fabric protocols are used to communicate on the first and second networks, respectively; and send the destination packet over the second network to the destination node to perform the storage I/O request with respect to the storage device.

13. The system of claim 12, wherein the program code is further executed to:

receive, from the destination node, a first I/O request in the transport protocol to transfer I/O data for the storage I/O request with respect to the host memory address;

buffer the I/O data in the transfer memory address when processing a direct data placement command; and transmit a second I/O request in the transport protocol to transfer the I/O data in the transfer memory address to the host memory address or a target memory address in the destination node.

14. The system of claim 13, wherein the first and second I/O requests in the transport protocol comprise first and second read requests in the transport protocol when the storage I/O request comprises a write request, and wherein the first and second I/O requests in the transport protocol comprise a first and second write requests in the transport protocol when the storage I/O request comprises a read request.

15. The system of claim 12, wherein the storage I/O request comprises a storage write request to write I/O data from the originating node to a target memory address in the destination node, wherein the program code is further executed to:

receive from the destination node a first read request in the transport protocol to read I/O data from the transfer memory address;

determine the host memory address that maps to the transfer memory address in the first read request; and transmit to the originating node a second read request in the transport protocol to read the I/O data from the determined host memory address.

16. The system of claim 15, wherein the program code is further executed to:

receive the I/O data from the host memory address in a first response, in the transport protocol, to the second read request;

store the received I/O data in the transfer memory address; and transmit the I/O data from the transfer memory address to the destination node in a second response, in the transport protocol, to the first read request.

17. The system of claim 12, wherein the storage I/O request comprises a storage read request to read I/O data from the storage device wherein the program code is further executed to:

receive a first write request, in the transport protocol, from the destination node, to write I/O data to the transfer memory address in response to the storage read request;

store the I/O data in the transfer memory address;

determine the host memory address that maps to the transfer memory address; and send a second write request, in the transport protocol, to the originating node to write the I/O data from the transfer memory address to the determined host memory address.

18. The system of claim 12, wherein the storage I/O request is transferred unmodified from the originating node to the destination node through the origination packet and the destination packet.

19. A method for communicating with nodes, comprising:

communicating with an originating node over a first network and communicating with a destination node over a second network;

receiving an origination packet from the originating node over the first network to a destination node having a storage device, wherein the origination packet includes a first fabric layer for transport through the first network, a command in a transport protocol with a storage Input/Output (I/O) request, with respect to the storage device at the destination node, and a host memory address;

determining a transfer memory address of a location in a memory device to map to the host memory address, wherein the memory device is in a system that is separate from the storage device and wherein the system is in communication with the storage device via the second network;

constructing a destination packet including a second fabric layer for transport through the second network and the command in the transport protocol to send the storage I/O request and the transfer memory address, wherein different first and second fabric protocols are used to communicate on the first and second networks, respectively; and sending the destination packet over the second network to the destination node to perform the storage I/O request with respect to the storage device.

20. The method of claim 19, further comprising:

receiving, from the destination node, a first I/O request in the transport protocol to transfer I/O data for the storage I/O request with respect to the host memory address;

buffering the I/O data in the transfer memory address when processing a direct data placement command; and transmitting a second I/O request in the transport protocol to transfer the I/O data in the transfer memory address to the host memory address or a target memory address in the destination node.

21. The method of claim 20, wherein the first and second I/O requests in the transport protocol comprise first and second read requests in the transport protocol when the storage I/O request comprises a write request, and wherein the first and second I/O requests in the transport protocol comprise a first and second write requests in the transport protocol when the storage I/O request comprises a read request.

22. The method of claim 19, wherein the storage I/O request comprises a storage write request to write I/O data from the originating node to a target memory address in the destination node, further comprising:

receiving from the destination node a first read request in the transport protocol to read I/O data from the transfer memory address;

determining the host memory address that maps to the transfer memory address in the first read request; and transmitting to the originating node a second read request in the transport protocol to read the I/O data from the determined host memory address.

23. The method of claim 22, further comprising:

receiving the I/O data from the host memory address in a first response, in the transport protocol, to the second read request;

storing the received I/O data in the transfer memory address; and transmitting the I/O data from the transfer memory address to the destination node in a second response, in the transport protocol, to the first read request.

24. The method of claim 19, wherein the storage I/O request comprises a storage read request to read I/O data from the storage device, further comprising:
receiving a first write request, in the transport protocol, from the destination node, to write I/O data to the transfer memory address in response to the storage read request;
storing the I/O data in the transfer memory address;
determining the host memory address that maps to the transfer memory address; and
sending a second write request, in the transport protocol, to the originating node to write the I/O data from the transfer memory address to the determined host memory address.

25. The method of claim 19, wherein the storage I/O request is transferred unmodified from the originating node to the destination node through the origination packet and the destination packet.

* * * * *